(12) United States Patent
Kato et al.

(10) Patent No.: US 10,686,182 B2
(45) Date of Patent: Jun. 16, 2020

(54) SECONDARY BATTERY

(71) Applicant: TOYOTA JIDOSHA KABUSHIKI KAISHA, Toyota-shi, Aichi (JP)

(72) Inventors: Masashi Kato, Konan (JP); Mizuho Matsumoto, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 112 days.

(21) Appl. No.: 15/795,591

(22) Filed: Oct. 27, 2017

(65) Prior Publication Data

US 2018/0123115 A1 May 3, 2018

(30) Foreign Application Priority Data

Oct. 31, 2016 (JP) .................................. 2016-212787

(51) Int. Cl.
*H01M 10/058* (2010.01)
*H01M 4/13* (2010.01)
(Continued)

(52) U.S. Cl.
CPC ........... *H01M 4/13* (2013.01); *H01M 2/1022* (2013.01); *H01M 2/16* (2013.01); *H01M 2/168* (2013.01);
(Continued)

(58) Field of Classification Search
None
See application file for complete search history.

(56) References Cited

U.S. PATENT DOCUMENTS

2006/0040176 A1* 2/2006 Ling ..................... H01M 2/266
429/160
2009/0029260 A1 1/2009 Hagiwara et al.
(Continued)

FOREIGN PATENT DOCUMENTS

CN 102683735 A 9/2012
JP 10302752 A * 11/1998
(Continued)

OTHER PUBLICATIONS

JP-2009032727-A English Translation (Year: 2009).*
JP-10302752-A English Translation (Year: 1998).*

*Primary Examiner* — Lucas J. O'Donnell
(74) *Attorney, Agent, or Firm* — Sughrue Mion, PLLC

(57) ABSTRACT

A secondary battery is provided, which includes a laminated electrode body and which has a current-collecting structure with favorable structural stability even when mounted to a vehicle and with superior high-rate charge-discharge characteristics. In a laminated electrode body included in a secondary battery provided by the present invention, a laminated positive electrode current collector-exposed portion and a laminated negative electrode current collector-exposed portion respectively constitute a plurality of current collector bundles which are bundled while being divided into two or more in a direction of lamination, each of the plurality of current collector bundles is individually and separately joined to the current collector portion on the same electrode side, and any of separators between positive and negative electrodes is enveloped in any of the plurality of current collector bundles on the side of the positive electrode current collector-exposed portion and/or any of the plurality of current collector bundles on the side of the negative electrode current collector-exposed portion.

5 Claims, 4 Drawing Sheets

(51) Int. Cl.
- *H01M 10/04* (2006.01)
- *H01M 10/052* (2010.01)
- *H01M 2/16* (2006.01)
- *H01M 2/26* (2006.01)
- *H01M 10/0585* (2010.01)
- *H01M 2/10* (2006.01)
- *H01M 10/00* (2006.01)

(52) U.S. Cl.
CPC ........... *H01M 2/266* (2013.01); *H01M 10/00* (2013.01); *H01M 10/0413* (2013.01); *H01M 10/0463* (2013.01); *H01M 10/052* (2013.01); *H01M 10/0585* (2013.01); *H01M 2220/20* (2013.01); *Y02E 60/122* (2013.01); *Y02E 60/13* (2013.01); *Y02T 10/7011* (2013.01)

(56) References Cited

U.S. PATENT DOCUMENTS

| | | |
|---|---|---|
| 2012/0237810 A1 | 9/2012 | Sasaki |
| 2013/0029188 A1* | 1/2013 | Kim .................... H01M 2/0217 429/53 |

FOREIGN PATENT DOCUMENTS

| | | |
|---|---|---|
| JP | 2000-100414 A | 4/2000 |
| JP | 2009-32727 A | 2/2009 |
| JP | 2015-115268 A | 6/2015 |
| JP | 2015-210922 A | 11/2015 |

* cited by examiner

SECONDARY BATTERY

BACKGROUND OF THE INVENTION

1. Field of the Invention

The present invention relates to a secondary battery. More specifically, the present invention relates to a secondary battery with a sealed structure which includes a laminated electrode body structured such that a plurality of positive and negative electrode sheets are alternately laminated. The present application claims priority on the basis of Japanese Patent Application No. 2016-212787 filed in Japan on Oct. 31, 2016, the entire contents of which are incorporated herein by reference.

2. Description of the Related Art

Secondary batteries such as lithium-ion secondary batteries and nickel-hydrogen batteries are favorably used not only in applications as so-called portable power supplies of personal computers, mobile terminals, and the like but also, in recent years, as vehicle driving power supplies. In particular, since lithium-ion secondary batteries are lightweight and produce high energy density, they are preferable as high-output power supplies for driving vehicles such as an electrical vehicle (EV), a plug-in hybrid vehicle (PHV), and a hybrid vehicle (HV) and demands for lithium-ion secondary batteries are expected to rise into the future.

A typical mode of a secondary battery of this type is a battery with a sealed structure (also referred to as a sealed battery) in which an electrode body constituting positive and negative electrodes and an electrolyte are housed in a prescribed battery case and an opening of the case is sealed. A typical example of an electrode body housed in such a sealed secondary battery is a so-called laminated electrode body structured such that rectangular sheet-shaped positive and negative electrodes (hereinafter, also respectively referred to as a "positive electrode sheet" and a "negative electrode sheet") are alternately laminated while interposing a separator between the sheet-shaped electrodes.

Since a battery capacity per unit volume of a laminated electrode body is relatively large, a laminated electrode body is preferable as a vehicle-driving power supply that desirably provides high capacity and high output, and a battery size or a battery capacity can be readily adjusted by increasing or reducing the number of laminated positive and negative electrode sheets. For example, Japanese Patent Application Laid-open No. 2015-115268 discloses an example of a laminated film-sealed type sealed secondary battery fabricated by housing, in a bag body constituted by a laminated film, a laminated electrode body in which a positive electrode sheet and a negative electrode sheet are alternately laminated while interposing a separator between the electrode sheets and, after injecting an electrolyte, sealing an opening of the film.

Another mode of a secondary battery adopting a laminated electrode body which differs from the laminated film-sealed type described above is a secondary battery structured such that a laminated electrode body is housed inside a square (box-like) hard case typically made of metal and an opening of the case is hermetically sealed by welding or the like. Since the electrode body is housed in a hard case in a secondary battery configured in this manner, the battery itself has higher physical strength with respect to external impact as compared to the laminated film-sealed type and therefore represents a favorable mode from the perspective of security.

In addition, by changing a size or a capacity of the used square (box-like) case, a size or a capacity of the housed electrode body can also be readily changed. Therefore, a high capacity secondary battery can be readily provided. For example, Japanese Patent Application Laid-open No. 2015-210922 describes a secondary battery with a sealed structure in which a laminated electrode body is housed in a square (box-like) hard case of this type.

SUMMARY OF THE INVENTION

With a secondary battery configured such that a laminated electrode body is housed in a square hard case, measures are required to further improve structural stability of the laminated electrode body itself in the case as compared to the laminated film-sealed type battery described above. Specifically, since a laminated electrode body is structured such that a positive electrode sheet and a negative electrode sheet are alternately laminated while interposing a separator between the electrode sheets, structural stability inside a battery case made of metal or another hard material and having a box-like shape is relatively low. Therefore, in order to maintain high-rate charge and discharge preferable as a vehicle driving power supply over a long period of time, it is important that the structure of the laminated electrode body is kept stable inside the battery case.

In particular, in order to prevent positional displacement from occurring between laminated positive and negative electrode sheets, a high holding force must be realized between the positive and negative electrode sheets and the separator in a direction of lamination of the laminated electrode body. For example, with the electrode body disclosed in Japanese Patent Application Laid-open No. 2015-210922 described above, in order to prevent positional displacement from occurring between laminated positive and negative electrode sheets, a holding tape is applied from a first broad width surface (an outer surface of either one of both ends in a direction of lamination of the laminated electrode body corresponding to a shape of the positive and negative electrode sheets; hereinafter, the same description will apply) to a second broad width surface so as to straddle a lamination surface of the laminated electrode body (a side surface of the laminated electrode body in the direction of lamination of the positive and negative electrode sheets; hereinafter, the same description will apply).

In addition, a current-collecting structure (specifically, a current-collecting tap structure protruding from a part of a peripheral edge of an electrode body) of a laminated electrode body in the modes described in Japanese Patent Application Laid-open No. 2015-115268 and Japanese Patent Application Laid-open No. 2015-210922 cannot be considered sufficient as a vehicle driving power supply required to perform quick high-rate charge and discharge with a relatively large current as a vehicle travels while being subjected to vibration.

The present invention has been devised in order to solve the above-mentioned problems related to a secondary battery including a laminated electrode body, and an object thereof is to provide a secondary battery with a sealed structure which includes a laminated electrode body capable of realizing higher capacity, which is particularly suitable as a vehicle driving power supply (a vehicle-mounted secondary battery), and which has a current-collecting structure with favorable structural stability even when mounted to a vehicle and superior high-rate charge-discharge characteristics.

In order to realize the object described above, the present invention provides a secondary battery including: a laminated electrode body having a structure in which a positive electrode having a rectangular sheet-shaped positive electrode current collector and a positive electrode active material layer formed on the positive electrode current collector, and a negative electrode having a rectangular sheet-shaped negative electrode current collector and a negative electrode active material layer formed on the negative electrode current collector are alternately laminated, with a rectangular sheet-shaped separator being interposed between the electrodes; an electrolyte; and a square case.

In addition, in a mode of the secondary battery disclosed herein, a positive electrode current-collecting portion and a negative electrode current-collecting portion electrically connected to external connection terminals (a general term for a positive electrode terminal and a negative electrode terminal provided on an outer surface of the secondary battery) are respectively provided inside the case.

Furthermore, in the secondary battery disclosed herein, a positive electrode current collector-exposed portion and a negative electrode current collector-exposed portion which do not include the active material layers are respectively formed along a short-side direction at respective first ends in long-side direction of the positive electrode and the negative electrode. Moreover, the laminated electrode body disclosed herein is structured in a state where the positive electrode current collector-exposed portion is laminated at a first end in the long-side direction and the negative electrode current collector-exposed portion is laminated at a second end in the long-side direction.

In addition, in the secondary battery disclosed herein, the laminated positive electrode current collector-exposed portion and the laminated negative electrode current collector-exposed portion respectively constitute a plurality of current collector bundles which are bundled while being divided into two or more in a direction of lamination thereof, and each of the plurality of current collector bundles is individually and separately joined to the current collector portion on the same electrode side.

Furthermore, any of the separators existing between any of the positive and negative electrodes located at a first end of the direction of lamination and any of the positive and negative electrodes located at a second end in the direction of lamination among the positive electrode and the negative electrode included in the laminated electrode body is enveloped in any of the plurality of current collector bundles on a side of the positive electrode current collector-exposed portion and/or any of the plurality of current collector bundles on a side of the negative electrode current collector-exposed portion (in other words, arranged on an inner side of the current collector bundles).

In the secondary battery configured as described above, the positive electrode current collector-exposed portion and the negative electrode current collector-exposed portion of the laminated electrode body are respectively joined (typically, joined by welding) to the positive electrode current-collecting portion and the negative electrode current-collecting portion provided inside the case. Accordingly, a position and posture of the laminated electrode body inside the case can be fixed and rattling of the laminated electrode body in the case can be prevented.

In addition, as described above, in the secondary battery disclosed herein, the positive electrode current collector-exposed portion and negative electrode current collector-exposed portion respectively constitute a plurality of current collector bundles which are bundled while being divided into two or more in a direction of lamination, and each of the plurality of current collector bundles is individually and separately joined to the current collector portion on a side of a same electrode.

As described above, with the current-collecting structure of the laminated electrode body according to the present configuration, since the plurality of current collector bundles formed in the positive electrode current collector-exposed portion and the negative electrode current collector-exposed portion located at both ends in the long-side direction are individually and separately capable of forming a conductive path with a current-collecting portion on a side of the same electrode, charge and discharge with a relatively large current (high-rate charge and discharge) can be performed in a preferable manner.

Furthermore, in the secondary battery disclosed herein, all of the separators existing between any of the positive and negative electrodes located at a first end in the direction of lamination and any of the positive and negative electrodes located at a second end in the direction of lamination among the positive electrode and the negative electrode included in the laminated electrode body or, in other words, all of the separators with respect to which positive and negative electrodes oppose each other on sides of both surfaces of the separator (hereinafter, also referred to as "separators between positive and negative electrodes") are arranged in a state where the separators are enveloped in any of the plurality of current collector bundles on the side of the positive electrode current collector-exposed portion and/or any of the plurality of current collector bundles on the side of the negative electrode current collector-exposed portion.

Inside the current collector bundle or, more specifically, in the positive and negative electrodes and the separator in a state of being sandwiched between the current collector-exposed portions at both ends in the direction of lamination or, in other words, the two current collector-exposed portions constituting an outer surface of a given current collector bundle among the plurality of positive electrode current collector-exposed portions (or a plurality of negative electrode current collector-exposed portions) constituting the current collector bundle, pressure is created in a direction of lamination of the positive and negative electrodes as stress that is created due to bundling a plurality of current collectors (exposed portions) in order to form the current collector bundles. The pressure increases a holding force on the positive and negative electrodes and the separator laminated inside the current collector bundle and, consequently, lateral positional displacement of the positive and negative electrodes and the separator laminated inside the current collector bundle with respect to the direction of lamination can be suppressed.

In addition, as described above, in the secondary battery disclosed herein, all of the separators between positive and negative electrodes are respectively enveloped in at least any of the positive and negative current collector bundles. As a result, in the secondary battery disclosed herein, the holding force can be created without interruption along the entire direction of lamination with respect to the laminated electrode body housed in the square battery case. Accordingly, lateral positional displacement of the positive electrode, the negative electrode, and the separator with respect to the direction of lamination can be suppressed along the entirety of the laminated electrode body and higher structural stability can be achieved.

In a preferable mode of the secondary battery disclosed herein, three or more current collector bundles are constituted in at least any one of the laminated positive electrode current collector-exposed portion and the laminated negative electrode current collector-exposed portion.

More favorably, three or more current collector bundles are constituted in both the positive electrode current collector-exposed portion and the negative electrode current collector-exposed portion.

By dividing the positive electrode (negative electrode) current collector-exposed portion so as to form three or more current collector bundles, both a current-collecting structure favorable for high-rate charge and discharge and structural stability capable of more preferably suppressing lateral positional displacement of the positive electrode, the negative electrode, and the separator with respect to the direction of lamination can be achieved at high levels.

Favorably, the separator of the laminated electrode body disclosed herein includes an adhesive capable of increasing adhesion with an opposing positive electrode or negative electrode.

By adopting a separator including an adhesive as the rectangular sheet-shaped separator which constitutes the laminated electrode body together with the rectangular sheet-shaped positive and negative electrodes, positional displacement between laminated positive and negative electrode sheets can be more preferably suppressed. Therefore, the structural stability of the laminated electrode body in the case can be increased in a more preferable manner.

DESCRIPTION OF THE PREFERRED EMBODIMENTS

Figure 1:
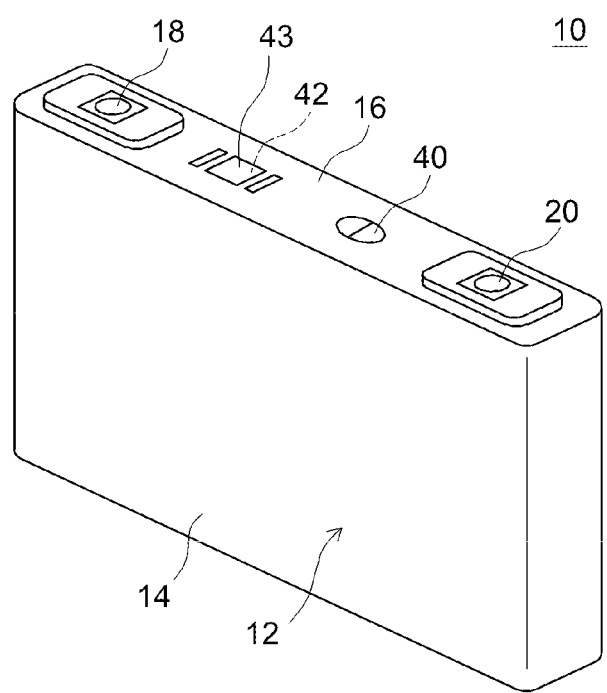
FIG. 1 is a perspective view schematically showing an external shape of a secondary battery (a lithium-ion secondary battery) with a sealed structure according to an embodiment.

Hereinafter, as an example of the secondary battery disclosed herein, a preferred embodiment of a lithium-ion secondary battery will be described in detail with reference to the drawings. With the exception of matters specifically mentioned in the present specification, matters required to carry out the present invention can be understood to be design matters of a person with ordinary skill in the art based on prior art in the relevant technical field. The present invention can be carried out based on the contents disclosed in the present specification and common general technical knowledge in the relevant field. While the following embodiment relates to a lithium-ion secondary battery, embodiments of the present invention are not limited to a lithium-ion secondary battery and the present invention can be preferably implemented in other secondary batteries to which a laminated electrode body is mountable such as an electric double layer capacitor, a lithium-ion capacitor, and a sodium-ion secondary battery.

In the present specification, an "active material" refers to a substance responsible for the absorption and desorption of a charge carrier (for example, lithium ions in the case of a lithium-ion secondary battery) at a positive electrode or a negative electrode. Moreover, it is to be understood that a numerical value range of A to B (where A and B are any numbers) in the present specification indicates a range of A or more and B or less.

Hereinafter, as an example of the secondary battery disclosed herein, a lithium-ion secondary battery of a mode in which a laminated electrode body and an electrolyte (in the present embodiment, a nonaqueous electrolyte) are housed in a square (in other words, a rectangular parallelepiped box shape) case will be described. Dimensional relationships (length, width, thickness, and the like) shown in the respective drawings reflect an emphasis placed on illustrative brevity and do not necessarily reflect actual dimensional relationships. In addition, members and portions that produce the same effects will be described using the same reference characters and overlapping descriptions will be omitted or simplified.

As shown in FIG. 1, a lithium-ion secondary battery 10 according to the present embodiment is a secondary battery with a sealed structure configured such that a flat laminated electrode body 50 (refer to FIG. 3) to be described later is housed, together with an electrolyte (in this case, a nonaqueous electrolyte: not shown) in a flat square case 12 (in other words, an outer container of the battery 10) corresponding to the shape of the laminated electrode body 50.

The square case 12 is constituted by a box-shaped (in other words, a bottomed rectangular parallelepiped) case main body 14 of which one end (corresponding to an upper surface of the battery 10 in a state of normal use) is formed as an opening and a lid 16 made of a rectangular plate member which is attached to and blocks the opening. As the lid 16 is welded to a peripheral edge of the opening of the case main body 14, the square case 12 with a sealed structure is constructed, the square case 12 having a hexahedron shape formed by a pair of case broad width surfaces opposing a broad width surface of the flat laminated electrode body and four rectangular side surfaces (specifically, an upper surface of one of the four side surfaces is constituted by the lid 16) adjacent to the case broad width surfaces.

Although not particularly restricted, an example of a preferable size of a square case of a battery of this type includes the following dimensions: a length of a long side of the case main body 14 and the lid 16 of 80 mm to 200 mm; a length of a short side of the case main body 14 and the lid 16 (in other words, a thickness of the case 12) of 8 mm to 40 mm; and a height of the case 12 of 70 mm to 150 mm. A size of the laminated electrode body need only be regulated to a size that can be housed in the square case used and is not particularly limited.

A material of the square case 12 (the case main body 14 and the lid 16) need only be similar to that used in a conventional secondary battery of this type and is not particularly restricted. The case 12 is favorably mainly constituted by a lightweight metal material with good thermal conductivity, and examples of such a metal material include aluminum, stainless steel, and nickel-plated steel.

As shown in FIG. 1, a negative electrode terminal 18 and a positive electrode terminal 20 for external connection are integrally formed on an outer surface of the lid 16. Moreover, a thin safety valve 40 configured so as to release internal pressure of the case 12 when the internal pressure rises to or exceeds a prescribed level and an electrolyte injection port 42 for supplying the nonaqueous electrolyte are formed between both terminals 18 and 20 of the lid 16. FIG. 1 represents a state after injection is completed and shows the electrolyte injection port 42 being sealed by a sealing material 43. Moreover, a mechanism of the safety valve 40 and a sealing mode of the electrolyte injection port may be similar to a conventional battery of this type and special configurations are not required.

Figure 2:
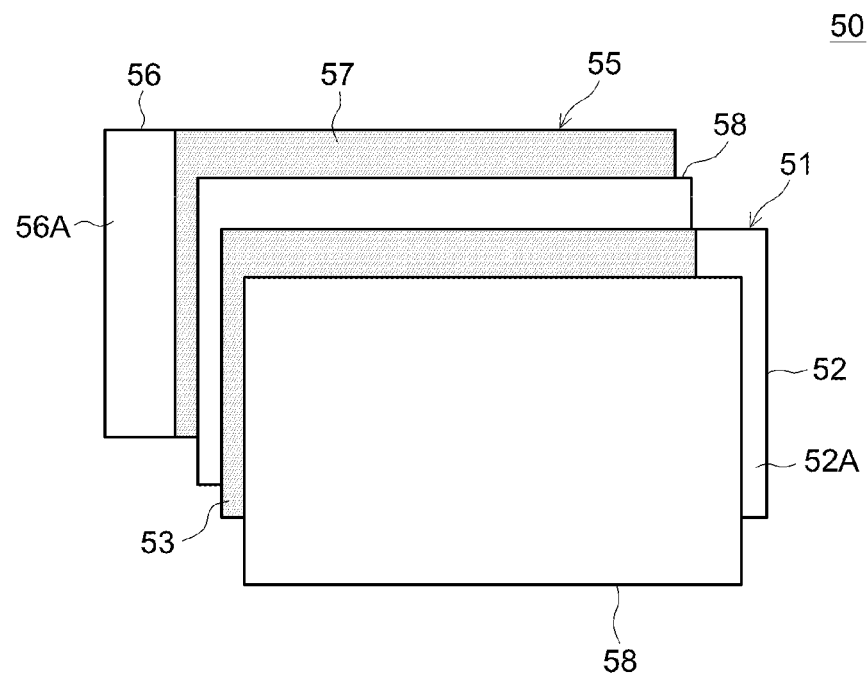
FIG. 2 is an explanatory diagram schematically showing respective members constituting a laminated electrode body according to an embodiment.

As shown in FIG. 2, the laminated electrode body 50 according to the present embodiment is constructed by alternately laminating a rectangular positive electrode sheet 51 and a negative electrode sheet 55 with a similar rectangular shape to the positive electrode sheet 51 while interposing a separator 58 with a similar rectangular sheet shape between the electrode sheets.

With the positive electrode sheet 51, a positive electrode active material layer 53 is formed on both surfaces of an elongated sheet-shaped positive electrode current collector 52. On the other hand, with the negative electrode sheet 55, a negative electrode active material layer 57 is formed on both surfaces of an elongated sheet-shaped negative electrode current collector 56. However, as illustrated, a positive electrode current collector-exposed portion 52A not including the positive electrode active material layer 53 is formed in a strip shape along a short-side direction at a first end in a long-side direction of the rectangular positive electrode current collector 52. In a similar manner, a negative electrode current collector-exposed portion 56A not including the negative electrode active material layer 57 is formed in a strip shape along the short-side direction at a second end in the long-side direction of the rectangular negative electrode current collector 56.

Figure 3:
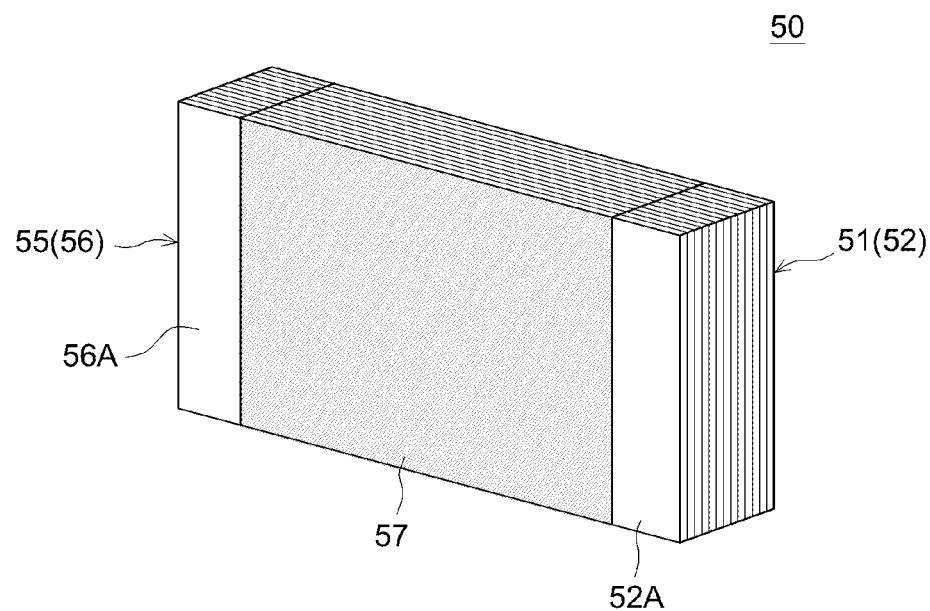
FIG. 3 is a perspective view schematically showing a configuration of a laminated electrode body according to an embodiment.

As shown in FIGS. 2 and 3, the positive electrode sheet 51 and the negative electrode sheet 55 are laminated with positions thereof slightly displaced in the long-side direction so that the positive electrode current collector-exposed portion 52A protrudes from a first end and the negative electrode current collector-exposed portion 56A protrudes from a second end in the long-side direction of the separator 58. As a result, as shown in FIG. 3, a portion in which the positive electrode current collector-exposed portion 52A is laminated and a portion in which the negative electrode current collector-exposed portion 56A is laminated are respectively formed at a first end and a second end in the long-side direction of the laminated electrode body 50. While the plurality of current collector bundles described earlier are to be respectively formed in the positive electrode current collector-exposed portion 52A and the negative electrode current collector-exposed portion 56A, the formation of the plurality of current collector bundles will be described later.

Moreover, in consideration of preferable and stable absorption and desorption of charge carriers in the laminated electrode body 50 according to the present embodiment, the negative electrode active material layer 57 and the positive electrode active material layer 53 are formed so that a size in the long-side direction of the negative electrode active material layer 57 is larger than a size in the long-side direction of the positive electrode active material layer 53.

In addition, in order to reliably insulate between the positive electrode active material layer 53 and the negative electrode active material layer 57, the separator 58 is formed so that a size in the long-side direction of the separator 58 is larger than the sizes in the long-side direction of the positive electrode active material layer 53 and the negative electrode active material layer 57. Hereinafter, each component will be described in greater detail.

As materials and members constituting the positive and negative electrodes of the laminated electrode body 50, materials and members similar to those used in a conventional general lithium-ion secondary battery can be used without restrictions.

For example, as the positive electrode current collector 52, those used as a positive electrode current collector of a lithium-ion secondary battery of this type can be used without particular restrictions. Typically, a metallic positive electrode current collector having preferable conductivity is favorable, in which case the positive electrode current collector is made of a metal material such as aluminum, nickel, titanium, and stainless steel. Aluminum (for example, an aluminum foil) is particularly favorable. Although a thickness of the positive electrode current collector 52 is not particularly limited, an appropriate thickness is around 5 μm to 50 μm and a more favorable thickness is around 8 μm to 30 μm in consideration of a balance between capacity density of the battery and strength of the current collector.

Examples of the positive electrode active material include a lithium composite metal oxide with a layered structure or a spinel structure (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, and $LiFePO_4$). For example, a LiNiCoMn composite oxide (such as $LiNi_{1/3}Co_{1/3}Mn_{1/3}O_2$) is a favorable example due to superior thermal stability and high energy density.

A lithium-manganese composite oxide with a spinel structure is also a preferable example. Examples thereof include $LiMn_2O_4$, $LiCrMnO_4$, and $LiNi_{0.5}Mn_{1.5}O_4$. These positive electrode active materials are preferable due to their capability of becoming a high-potential positive electrode active material capable of realizing an open circuit voltage (OCV) of 4.3 V or higher based on lithium metal (vs. $Li/Li^+$).

The positive electrode active material layer 53 may contain components other than the positive electrode active material such as a conductive material or a binder. As the conductive material, carbon black such as acetylene black (AB) and other carbon material (such as graphite) may be preferably used. As the binder, polyvinylidene fluoride (PVDF) or the like may be used.

A thickness of the positive electrode active material layer 53 may typically be set to 10 μm or more (for example, 50 μm or more) and 200 μm or less (for example, 100 μm or less). In addition, while density of the positive electrode active material layer 53 is not particularly limited, the density may typically be set to 15 g/cm³ or higher (for example, 2 g/cm³ or higher) and 4.5 g/cm³ or lower (for example, 4.2 g/cm³ or lower). The positive electrode active material layer 53 in such a mode is capable of realizing high battery performance (for example, high energy density or output density).

The positive electrode active material layer 53 described above can be formed by dispersing a positive electrode active material and a material (a conductive material, a binder, or the like) used when necessary in a suitable solvent (for example, N-methyl-2-pyrrolidone: NMP) to prepare a paste-like (or slurry-like) composition, and applying an appropriate amount of the composition to a surface of the positive electrode current collector 52 and drying the applied composition. In addition, properties (for example, an average thickness, density, and porosity) of the positive electrode active material layer 53 can be adjusted as necessary by applying an appropriate pressing process.

Meanwhile, as the negative electrode current collector 56, those used as a negative electrode current collector of a lithium-ion secondary battery of this type can be used without particular restrictions. Typically, a metallic negative electrode current collector with preferable conductivity is favorable and, for example, copper (for example, copper foil) or a copper-based alloy can be used. Although a thickness of the negative electrode current collector 56 is not particularly limited, an appropriate thickness is around 5 µm to 50 µm and a more favorable thickness is around 8 µm to 30 µm in consideration of a balance between capacity density of the battery and strength of the current collector.

One or two or more materials conventionally used in lithium-ion secondary batteries can be used without limitation as the negative electrode active material. Examples of these materials include particulate (or spherical or squamous) carbon materials containing a graphite structure (layered structure) in at least a portion thereof, lithium-transition metal composite oxides (for example, a lithium-titanium composite oxide such as $Li_4Ti_5O_{12}$), and lithium-transition metal composite nitrides. Examples of carbon materials include natural graphite, artificial graphite, non-graphitizable carbon (hard carbon), and graphitizable carbon (soft carbon). Alternatively, carbon particles in such a form that a graphite particle as a core is covered (coated) by an amorphous carbon material may be used.

In addition to the negative electrode active materials described above, the negative electrode active material layer 57 may contain arbitrary components such as a binder or a thickener as necessary.

As the binder and the thickener, those conventionally used in a negative electrode of a lithium-ion secondary battery of this type can be adopted as appropriate. For example, styrene butadiene rubber (SBR) or the like can be preferably used as the binder and carboxymethyl cellulose (CMC) or the like can be preferably used as the thickener.

Typically, a thickness of the negative electrode active material layer 57 is favorably set to 20 µm or more (for example, 50 µm or more) and 200 µm or less (for example, 100 µm or less). In addition, while density of the negative electrode active material layer 57 is not particularly limited, typically, the density is favorably set to 0.5 $g/cm^3$ or higher (for example, 1 $g/cm^3$ or higher) and 2 $g/cm^3$ or lower (for example, 1.5 $g/cm^3$ or lower).

The negative electrode active material layer 57 described above can be formed by dispersing a negative electrode active material and a material (such as a binder) used when necessary in a suitable solvent (for example, deionized water) to prepare a paste-like (or slurry-like) composition, and applying an appropriate amount of the composition to a surface of the negative electrode current collector 56 and drying the applied composition. In addition, properties (for example, an average thickness, density, and porosity) of the negative electrode active material layer 57 can be adjusted as necessary by applying an appropriate pressing process.

As the separator 58, conventionally known separators made of a porous sheet can be used without particular restrictions. Examples include a porous resin sheet (a film or a non-woven fabric) made of a polyolefin resin such as polyethylene (PE) or polypropylene (PP). The porous sheet may have a single layer structure or a multi-layered structure of two layers or more (for example, a three-layered structure in which a PP layer is laminated on both sides of a PE layer). Alternatively, a configuration may be adopted in which a porous heat-resistant layer is provided on one surface or both surfaces of a porous sheet. The heat-resistant layer may be, for example, a layer (also referred to as a filler layer) including an inorganic filler and a binder. As the inorganic filler, for example, alumina, boehmite, and silica may be favorably adopted. While a thickness of the separator is not limited, for example, the thickness is favorably set within a range of 10 µm to 40 µm.

As the used separator 58, a separator including an adhesive capable of improving adhesion with the opposing positive electrode sheet 51 (of which a major portion is the positive electrode active material layer 53) or the opposing negative electrode sheet 55 (of which a major portion is the negative electrode active material layer 57) is particularly favorable. The inclusion of the adhesive enables an adhesive force with at least one (or both) of the laminated positive electrode sheet 51 and the laminated negative electrode sheet 55 to be increased. As a result, positional displacements of the laminated positive and negative electrode sheets 51 and 55 can be suppressed and the structural stability of the laminated electrode body 50 can be improved.

A mode of a separator including an adhesive is not particularly limited and separators of various modes can be used. Examples include a separator having, on a surface of a substrate made of a polyolefin porous sheet, an adhesive layer containing an adhesive component made of an adhesive (or viscous) resin composition such as a fluorine-based resin, an acrylic-based resin, a polyamide-based resin, a polyimide-based resin, and a polyurethane-based resin. While a thickness of such an adhesive layer is not particularly limited, a thickness of around 0.2 µm to 1.0 µm is appropriate.

Figure 4:
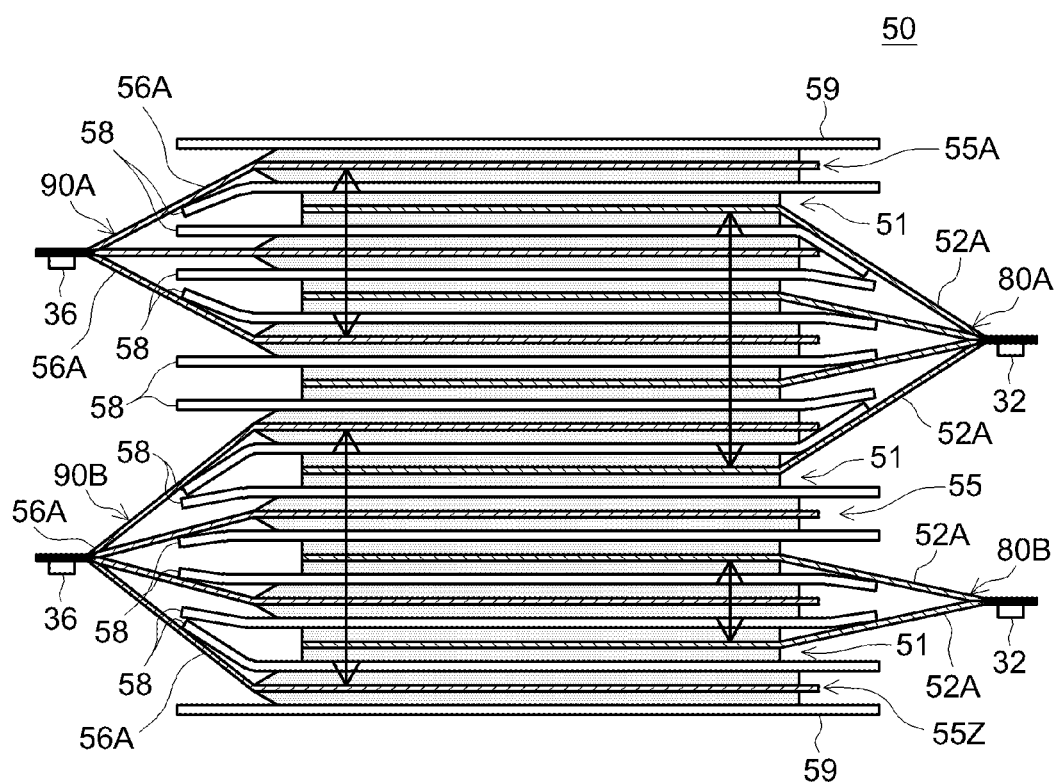
FIG. 4 is a sectional view schematically showing respective current-collecting structures (plurality of current collector bundles) on sides of positive and negative electrodes of a laminated electrode body according to an embodiment.

As shown in FIGS. 3 and 4, the laminated electrode body 50 is constructed by laminating a desired number of sets respectively constituted by the positive electrode sheet 51, the negative electrode sheet 55, and the separator 58 (favorably, a separator including an adhesive) configured as described above. In the present embodiment, in consideration of characteristics of a lithium-ion secondary battery, one more negative electrode sheet 55 than the positive electrode sheet 51 is laminated so that both ends in the direction of lamination are both negative electrode sheets 55A and 55Z (refer to FIG. 4). In addition, in order to further increase insulation properties inside the case 12, a separator 59 may be further arranged on an outer surface side of the negative electrode sheet 55A at the first end in the direction of lamination and, in a similar manner, the separator 59 may be further arranged on an outer surface side of the negative electrode sheet 55Z at the second end in the direction of lamination (shown only in FIG. 4). Alternatively, in place of the separators 59, a film made of an insulating synthetic resin may be arranged between the laminated electrode body 50 and an inner wall of the case 12.

After prescribed numbers of the positive electrode sheet 51, the negative electrode sheet 55, and the separators 58 are laminated, the laminate is pressed in the direction of lamination with appropriate pressure. At this point, by performing heat press at a desired temperature as necessary, adhesion between the separator (particularly, a separator including an adhesive) and opposing positive and negative electrodes can be improved. A size of the electrode body 50 is not particularly limited. The electrode body 50 can be given a shape corresponding to the size of the case described above.

The nonaqueous electrolyte housed in the square case 12 together with the laminated electrode body 50 contains a supporting salt in an appropriate nonaqueous solvent, and conventionally known nonaqueous electrolytes in applications of a lithium-ion secondary battery can be adopted without particular restrictions. For example, as the nonaqueous solvent, ethylene carbonate (EC), diethyl carbonate (DEC), dimethyl carbonate (DMC), ethyl methyl carbonate (EMC), and the like can be used. In addition, for example, a lithium salt such as $LiPF_6$ can be preferably used as the supporting salt.

Various additives (for example, a film-forming material) may be added to the nonaqueous electrolyte in addition to the nonaqueous solvent and the supporting salt described above. Examples include lithium salts having an oxalate complex as an anion such as lithium bis (oxalate) borate ($LiB(C_2O_4)_2$), $LiBF_2(C_2O_4)$, and $LiPF_2(C_2O_4)$, lithium difluorophosphate ($LiPO_2F_2$), vinylene carbonate (VC), vinyl ethylene carbonate (VEC), fluoroethylene carbonate (FEC), ethylene sulfite (ES), propane sultone (PS), and lithium bis (trifluoromethanesulfonyl) imide (LiTFSI). Only one of these additives may be used independently, or two or more of the additives may be used in combination with each other. When a solubility limit of each additive described above in the used nonaqueous solvent is assumed to be 100%, a concentration of the additive in the nonaqueous electrolyte favorably causes 5% to 90% of the additive to dissolve in the nonaqueous electrolyte. Typically, when using ($LiB(C_2O_4)_2$) or $LiPO_2F_2$, a concentration of each additive is adjusted to be within a range of 0.01 mol/L or higher and 0.2 mol/L or lower. For example, the additives can be added so that the concentration in the nonaqueous electrolyte is respectively 0.01 mol/L or higher and 0.1 mol/L or lower.

In addition, the lithium-ion secondary battery 10 according to the present embodiment is constructed using the laminated electrode body 50 and the nonaqueous electrolyte configured as described above. First, a current-collecting structure of the laminated electrode body 50 will be described.

As shown in FIG. 4, in the current-collecting structure of the laminated electrode body 50 according to the present embodiment, with respect to the laminated positive electrode current collector-exposed portion 52A shown on the right side of the diagram, two positive electrode current collector bundles 80A and 80B which are bundled while being divided into two at a numerical ratio of approximately 2:1 in the direction of lamination are formed. On the other hand, with respect to the laminated negative electrode current collector-exposed portion 56A shown on the left side of the diagram, two negative electrode current collector bundles 90A and 90B which are bundled while being divided into two at a numerical ratio of approximately 3:4 in the direction of lamination are formed.

Converging portions of the illustrated positive electrode current collector bundles 80A and 80B and negative electrode current collector bundles 90A and 90B are respectively joined by welding to a positive electrode current-collecting portion 32 and a negative electrode current-collecting portion 36 (refer to FIG. 5) to be described later. As described above, since the plurality of current collector bundles 80A, 80B, 90A, and 90B are individually and separately joined to the current-collecting portions 32 and 36 on a side of the same electrode and are capable of forming a conductive path, charge and discharge with a relatively large current (high-rate charge and discharge) can be performed in a preferable manner.

In addition, as shown in FIG. 4, in the laminated electrode body 50 according to the present embodiment, all of the separators 58 between positive and negative electrodes which exist between the negative electrode sheet 55A located at the first end in the direction of lamination and the negative electrode sheet 55Z located at the second end in the direction of lamination are arranged in a state of being enveloped in any of the positive electrode current collector bundles 80A and 80B and/or any of the negative electrode current collector bundles 90A and 90B.

Therefore, in the laminated electrode body 50 according to the present embodiment, as indicated by the vertical arrows in FIG. 4, the holding force described earlier can be created without interruption along the entire direction of lamination. Accordingly, lateral positional displacements of the positive electrode sheet 51, the negative electrode sheet 55, and the separator 58 with respect to the direction of lamination can be suppressed along the entirety of the laminated electrode body 50.

Next, assembly of the laminated electrode body 50 and the square case 12 according to the present embodiment will be described.

Figure 5:
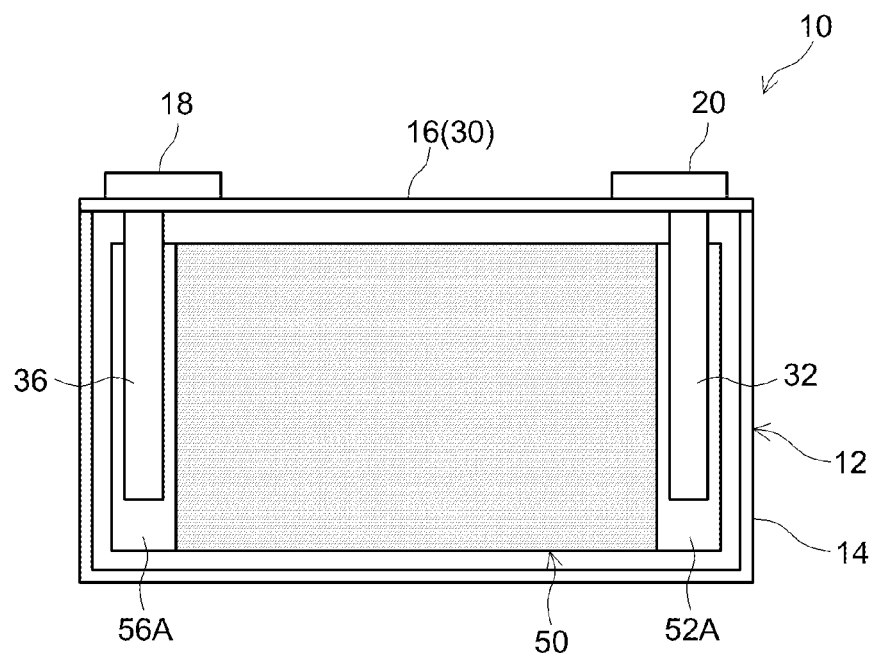
FIG. 5 is a front view schematically showing a state where a laminated electrode body according to an embodiment is housed in a square case.

As schematically shown in FIG. 5, the positive electrode current-collecting portion 32 and the negative electrode current-collecting portion 36 that are respectively electrically connected to the positive electrode terminal 20 and the negative electrode terminal 18 are provided on an inner surface of the lid 16 according to the present embodiment so as to protrude downward from the lid 16. A material of the positive and negative electrode current-collecting portions 32 and 36 may be a same or similar type of metal as corresponding positive and negative electrode current collectors and is not particularly restricted.

A lid-integrated current collector assembly 30 is constructed which integrates the lid 16, the positive and negative electrode terminals 20 and 18, and the long plate-shaped positive and negative electrode current-collecting portions 32 and 36.

Therefore, by attaching the laminated electrode body 50 to the lid-integrated current collector assembly 30 by joining means such as welding, the laminated electrode body 50 in the case 12 is fixed by being integrated with the lid 16 and a posture and a structure of the laminated electrode body 50 can be maintained at a high level.

Specifically, as illustrated, the positive electrode current-collecting portion 32 and the negative electrode current-collecting portion 36 according to the present embodiment are respectively formed as a long plate-shaped current collector plate extending in parallel in the short-side direction of the laminated electrode body 50 in a state of being arranged inside the case 12. While a detailed shape is not shown, the positive electrode current-collecting portion 32 and the negative electrode current-collecting portion 36 have a structure branched in accordance with the number of corresponding current collector bundles 80A, 80B, 90A, and 90B (in the present embodiment, a structure branched into two on both positive and negative electrode sides), and a tip of the branched current-collecting portions are respectively arranged on side surfaces of converging portions of the current collector bundles 80A, 80B, 90A, and 90B and spot welding is performed. Accordingly, the laminated electrode body 50 is joined in a conductive state to the lid-integrated current collector assembly 30 at prescribed joining portions on the sides of the positive and negative electrodes (in the present embodiment, the converging portions of the respective current collector bundles 80A, 80B, 90A, and 90B on both positive and negative electrode sides). Means of spot welding may be similar to conventional means and are not limited to special welding means. For example, joining can be performed by ultrasonic welding, resistance welding, laser welding, and the like.

After welding, the joined laminated electrode body 50 and the lid-integrated current collector assembly 30 are mounted to the case main body 14 in a state where the laminated electrode body 50 is housed inside the case. Subsequently, after welding a peripheral edge portion of the opening of the case main body 14 and a peripheral edge portion of the lid 16 to seal the square case 12, by injecting the nonaqueous electrolyte from the electrolyte injection port 42 provided on the lid 16 and then blocking the electrolyte injection port 42 with the prescribed sealing material 43, the lithium-ion secondary battery 10 according to the present embodiment is constructed. After construction, by performing an initial charging process, an aging process, and the like under prescribed conditions, the lithium-ion secondary battery 10 in a usable state is provided.

While a secondary battery according to a preferred embodiment of the present invention has been described in detail with reference to the drawings, the present invention is not limited to the embodiment.

For example, in order to further improve the structural stability of the laminated electrode body 50, a holding tape may be applied to a broad width surface so as to bridge a lamination surface of the laminated electrode body 50.

In addition, the numbers of formed positive electrode current collector bundles 80A and 80B and formed negative electrode current collector bundles 90A and 90B (in other words, the numbers of divisions of the positive electrode current collector-exposed portion 52A and the negative electrode current collector-exposed portion 56A) are not limited to two.

Figure 6:
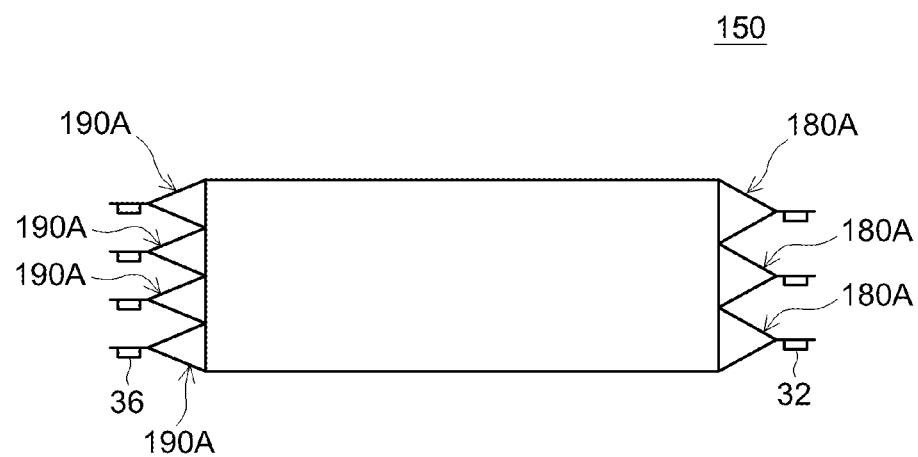
FIG. 6 is a diagram schematically showing respective current-collecting structures (plurality of current collector bundles) on sides of positive and negative electrodes of a laminated electrode body according to another embodiment.

For example, as in the case of a laminated electrode body 150 according to an embodiment shown in FIG. 6, three or four or more current collector bundles 180A and 190A may be provided. In addition, as long as all of the separators between positive and negative electrodes are arranged in a state of being enveloped in any of the positive electrode current collector bundles and/or any of the negative electrode current collector bundles and are capable of creating the holding force described earlier across the entirety of the laminated electrode body 150, the number of positive electrode current collector bundles 180A and the number of negative electrode current collector bundles 190A may or may not be the same.

As described above, a secondary battery such as the lithium-ion secondary battery disclosed herein includes a laminated electrode body capable of realizing higher capacity and has a current-collecting structure with favorable structural stability and superior high-rate charge and discharge characteristics. Therefore, the lithium-ion secondary battery disclosed herein can be preferably used as a vehicle driving power supply (a vehicle-mounted secondary battery).

What is claimed is:

1. A secondary battery, comprising:
a laminated electrode body having a structure in which a positive electrode having a rectangular sheet-shaped positive electrode current collector and a positive electrode active material layer formed on the positive electrode current collector, and a negative electrode having a rectangular sheet-shaped negative electrode current collector and a negative electrode active material layer formed on the negative electrode current collector are alternately laminated, with a rectangular sheet-shaped separator interposed between the electrodes;
an electrolyte; and
a square case, wherein
a positive electrode current-collecting portion and a negative electrode current-collecting portion electrically connected to external connection terminals are respectively provided inside the case,
a positive electrode current collector-exposed portion and a negative electrode current collector-exposed portion which do not include the active material layers are respectively formed along a short-side direction at respective first ends in a long-side direction of the rectangular sheet-shaped positive electrode current collector and the rectangular sheet-shaped negative electrode current collector,
the laminated electrode body is structured in a state where the positive electrode current collector-exposed portion is laminated at a first end in the long-side direction and the negative electrode current collector-exposed portion is laminated at a second end in the long-side direction,
the laminated positive electrode current collector-exposed portion constitute a plurality of positive current collector bundles and the laminated negative electrode current collector-exposed portion constitute a plurality of positive current collector bundles, each bundle of the positive current collector bundles and each bundle of the negative current collector bundles is bundled while being divided into two or more in a direction of lamination thereof, the each bundle of the positive plurality of current collector bundles is individually and separately joined to the current collector portion on the same electrode side, and the each bundle of the negative plurality of current collector bundles is individually and separately joined to the current collector portion on the same electrode side, and
any of separators existing between any of the positive and negative electrodes located at a first end in the direction of lamination and any of the positive and negative electrodes located at a second end in the direction of lamination among the positive electrode and the negative electrode included in the laminated electrode body is enveloped in any of the plurality of current collector bundles on a side of the positive electrode current collector-exposed portion and/or any of the plurality of current collector bundles on a side of the negative electrode current collector-exposed portion,
the number of laminated current collector-exposed portions within a bundle of the positive current collector bundles that is closest to an end of the case is different than the number of laminated current collector-exposed portions within a bundle of the negative current collector bundles that is closest to the end of the case.

2. The secondary battery according to claim 1, wherein three or more current collector bundles are constituted in at least any one of the laminated positive electrode current collector-exposed portion and the laminated negative electrode current collector-exposed portion.

3. The secondary battery according to claim 2, wherein three or more current collector bundles are constituted in both the laminated positive electrode current collector-exposed portion and the laminated negative electrode current collector-exposed portion.

4. The secondary battery according to claim 1, wherein the separator includes an adhesive capable of improving adhesion with the opposing positive electrode or the opposing negative electrode.

5. The secondary battery according to claim 1, wherein each of the positive currently collector bundles constitutes a different number of laminated current collector-exposed portions, and each of the negative currently collector bundles constitutes a different number of laminated current collector-exposed portions.

* * * * *